(12) United States Patent
Chen et al.

(10) Patent No.: US 9,117,280 B2
(45) Date of Patent: Aug. 25, 2015

(54) DETERMINING IMAGES OF ARTICLE FOR EXTRACTION

(71) Applicant: Microsoft Corporation, Redmond, WA (US)

(72) Inventors: Yu Chen, Beijing (CN); Ruihua Song, Beijing (CN); Guangping Gao, Beijing (CN); Qian Zhang, Issaquah, WA (US); Ming Liu, Bellevue, WA (US); Raman Narayanan, Seattle, WA (US); Shelley Summer Gu, Seattle, WA (US); Yanti Aruswati Gouw, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/037,177

(22) Filed: Sep. 25, 2013

(65) Prior Publication Data

US 2015/0063696 A1    Mar. 5, 2015

(51) Int. Cl.
*G06K 9/34* (2006.01)
*G06T 7/00* (2006.01)
*G06K 9/00* (2006.01)

(52) U.S. Cl.
CPC .......... *G06T 7/0079* (2013.01); *G06K 9/00087* (2013.01); *G06K 9/00711* (2013.01)

(58) Field of Classification Search
CPC .... H04W 4/18; H04N 21/00; H04N 21/4662; H04N 21/4668; H04N 21/6543; H04N 21/6582; H04N 21/8153; H04N 21/8543; G06T 7/0038; G06T 11/60; G06F 3/01; G06F 3/0482; G06F 17/00; G06F 17/21; G06F 17/2241; G06F 17/2247; G06F 17/24; G06F 17/30002; G06F 17/3005; G06F 17/30035; G06F 17/30038; G06F 17/30053; G06F 17/30056; G06F 17/3089; G06F 17/30247; G06F 17/30265; G06F 17/30522; G06F 17/30575; G06F 17/30702; G06F 17/30722; G06F 17/30817; G06F 17/30828; G06F 17/30902; G06F 17/30905; H04L 65/403; H04L 67/02; H04L 67/26; H04L 67/306; H04L 67/327; G06Q 10/107; G06Q 30/00; G06Q 30/02; G06Q 30/0631; G06Q 50/01; G11B 27/028; G11B 27/031; G11B 27/322; H04M 1/72561; G06K 9/00718
See application file for complete search history.

(56) References Cited

U.S. PATENT DOCUMENTS 7,660,804 B2    2/2010   Wen et al.
8,145,034 B2 *  3/2012   Miyajima et al. ............. 386/241
(Continued)

OTHER PUBLICATIONS

Song, et al., "Learning Block Importance Models for Web Pages", Retrieved at <<http://research.microsoft.com/en-us/um/people/jrwen/jrwen_files/publications/BlockImportance.PDF>>, In Proceedings of the 13th International Conference on World Wide Web, May 17, 2004, pp. 9.

(Continued)

*Primary Examiner* — Jose Couso
(74) *Attorney, Agent, or Firm* — Jessica Meyers; Jim Ross; Micky Mihas

(57) ABSTRACT

A content application determines images of an article for extraction. The content application identifies an initial image associated with a content of the article. A caption and a credit line associated with the initial image is detected and the initial image is extracted along with the caption and the credit line. A second image of the article associated with a video is also detected and extracted along with the video. In addition, the content application extracts a slideshow detected within the article.

20 Claims, 8 Drawing Sheets

(56) References Cited

U.S. PATENT DOCUMENTS

| | | | |
|---|---|---|---|
| 8,352,552 B2 | 1/2013 | Kaghazian | |
| 8,494,347 B2* | 7/2013 | Wada et al. | 386/248 |
| 8,600,979 B2* | 12/2013 | Kim et al. | 707/722 |
| 8,620,021 B2* | 12/2013 | Knudson et al. | 382/100 |
| 8,811,771 B2* | 8/2014 | Shechtman et al. | 382/293 |
| 2006/0107205 A1 | 5/2006 | Makela | |
| 2006/0149726 A1 | 7/2006 | Ziegert et al. | |
| 2006/0282758 A1 | 12/2006 | Simons et al. | |
| 2009/0234784 A1 | 9/2009 | Buriano et al. | |
| 2013/0019149 A1 | 1/2013 | Spencer et al. | |
| 2013/0124513 A1 | 5/2013 | Bignert et al. | |
| 2013/0179839 A1* | 7/2013 | Nakamura et al. | 715/830 |

OTHER PUBLICATIONS

Yin, et al., "Optimization of Web Page for Mobile Devices", Retrieved at <<http://www.comp.nus.edu.sg/~leews/publications/www04.pdf>>, In 13th International World Wide Web Conference, May 2004, pp. 9.

Fauzi, et al., "Multifaceted Conceptual Image Indexing on the World Wide Web", In Journal-Information Processing & Management, vol. 49, Issue 2, Mar. 2013, pp. 420-440.

Hong, et al., "Visual Data Alignment for Search Engine Results", In Second International Conference on Computer Research and Development, May 7, 2010, pp. 141-145.

"International Search Report and Written Opinion issued in PCT Patent Application No. PCT/US2014/056705", Mailed Date: Dec. 16, 2014, 11 pages.

* cited by examiner

DETERMINING IMAGES OF ARTICLE FOR EXTRACTION

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render visual effects through a display and enable users to provide input associated with the applications' operations.

Recently, devices of limited display size have penetrated the customer markets successfully. In some instances, limited purpose devices such as tablets have replaced multipurpose devices such as laptops for use in media consumption. Another consumer consumption pattern shifting towards limited purpose devices includes consumption of articles. Presenters prepare articles with multiple elements to generate advertisement revenue. Such articles provide interactive content to the user while being a source of revenue for the presenter. In addition, added features such as altering font type attributes improve on user interactivity compared to traditional sources of media such as paper productions. However, applications presenting articles are unable to re-assemble the contents of the articles to match the display size limitations of devices presenting the documents. Display size limitations may inconvenience users by displaying small portions of the articles and forcing users to scroll endlessly to reach desired content. Extensive scroll action involving multiple user actions may inhibit consumption flow and diminish user experience while consuming an article.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to determining images of content such as an article for extraction. According to some embodiments, a content application may identify an image associated with a content of an article. A caption and a credit line may be detected associated with the image. And, the image, the caption, and the credit line may be extracted.

Next, another image of the article may be detected associated with a video. The other image may be a screenshot of the video, for example. As a result, the other image and the video may be extracted. In yet other examples, a slideshow may be detected within the article. The slideshow may be presented through a representative image along with multiple hidden images. The content application may extract the slideshow by using the representative image as a template and retrieving the hidden images through a utilization of the template.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
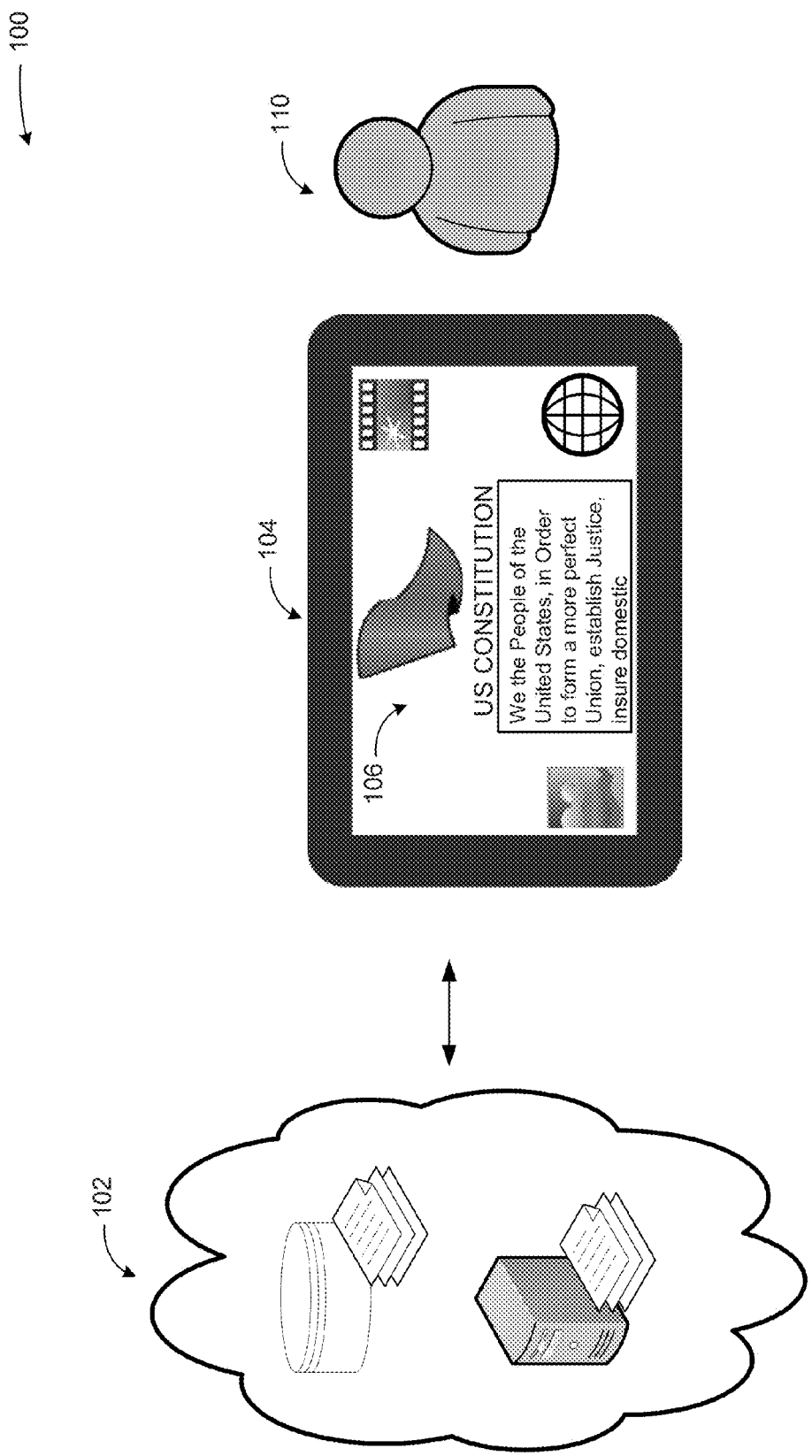
FIG. 1 illustrates an example concept diagram of determining images of an article for an extraction according to some embodiments.

As briefly described above, an image, a caption, and a credit line associated with the image may be extracted after detection. Other extractions may include a representative image of an embedded video along with the video content itself, a representative image of an embedded slideshow and the slideshow itself, and similar ones.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for determining images of an article for an extraction. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of determining images of an article for extraction according to some embodiments. The components and environments shown in diagram 100 are for illustration purposes. Embodiments may be implemented in various local, networked, cloud-based and similar computing environments employing a variety of computing devices and systems, hardware and software.

A device 104 may display an article 106 through a content application as a result of an action by user 110. The article may include image(s) associated with a content of the article. The content may be determined based on tags identifying the content including a body section. In addition, a caption and a credit line may be detected associated with the image. The caption may include a text description associated with the image. The credit line may include identifier information associated with a user. A creator of the image may be identified within the credit line. Furthermore, the image may be associated with a video. The image may be a sample screenshot of the video. And, the image may be actionable to initiate a play action of the video. Additionally, a slideshow may be identified within the article including multiple hidden images associated with the displayed image of the slideshow.

The device 104 may communicate with external resources such as a cloud-hosted platform 102 to present the article 106. In an example scenario, the device 104 may retrieve the article 106 from the external resources. The cloud-hosted platform 102 may include remote resources such as data stores and content servers. The article 106 may have multiple images. The images may be analyzed to determine an association with a content of the article to find candidates for extraction.

Embodiments are not limited to implementation in a device 104 such as a tablet. The content application, according to embodiments, may be a local application executed in any device capable of displaying the application. Alternatively, the content application may be a hosted application such as a web service which may execute in a server while displaying application content through a client user interface such as a web browser. In addition to a touch-enabled device 104, interactions with the image may be accomplished through other input mechanisms such as an optical gesture capture, a gyroscopic input device, a mouse, a keyboard, an eye-tracking input, and comparable software and/or hardware based technologies.

Figure 2:
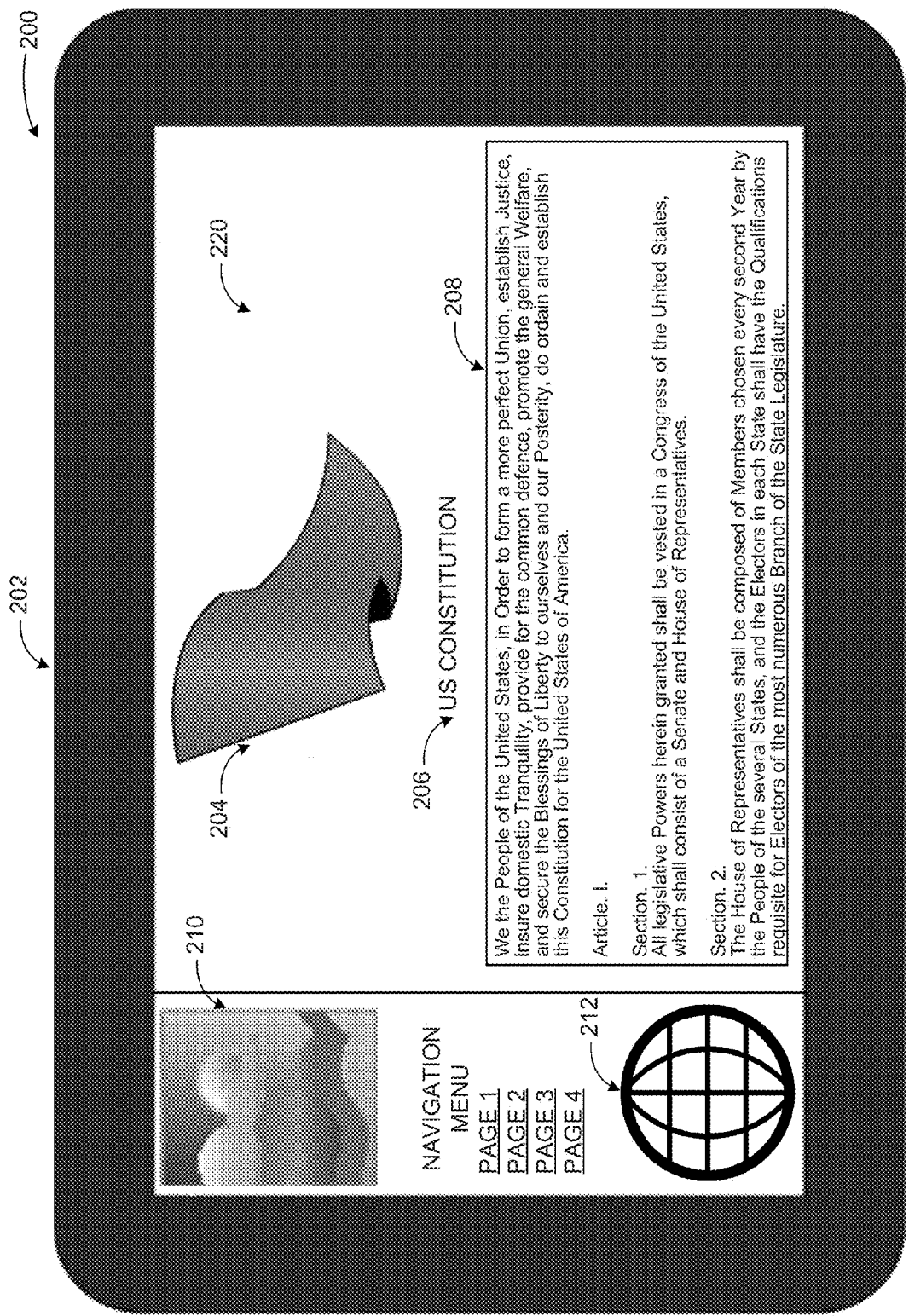
FIG. 2 illustrates an example of detecting images within a content of an article according to embodiments.

FIG. 2 illustrates an example of detecting images within a content of an article according to embodiments. Diagram 200 displays the content application within a device 202 such as a tablet. The content application may display an article 220 having multiple elements including images and text.

An image 204 may be identified to reside within a content of an article 220 in response to detecting the image 204 at a predefined location within the article 220. In addition, the image may also be detected to have a size within a predefined range. The image may be identified to reside within the content if its location may be determined to be before a title 206, between a title 206 and a content text 208, and within the content text 208. The title 206 and content text 208 may be identified through associated hypertext markup language (HTML) tags.

After a title 206 and a content text 208 may be extracted, the content application may determine a relative location of <IMG> tags of the image 204 compared to the title 206 and the content text 208. The article 220 may be interpreted as a document stream. The order of HTML tags within the document stream may be analyzed because the order may determine a relative location of the tags within the article. To determine the order, the source code of the article may be parsed into a document object model (DOM) tree. Tags within the source code may be assigned a source index. The order may be determined through the source index which may represent the order of the tags appearing within the document stream.

In addition, a size of the image 204 may be determined by analyzing the image 204 and classifying the size of the image 204 into three classifications. The classifications may include a large image, a middle image, and a thumbnail image, for example. The large image classification may be determined when the width of the image 204 may be greater or equal to a first predetermined value including 400 pixels. In addition, the large image classification may be within a width to a height ratio of a predetermined range including ⅓ to 3. A middle image classification may be determined when a width of the image 204 may be less than the first predetermined value including 400 pixels while both the width and height are greater than a second predetermined width value including 120 pixels. A thumbnail image classification may be determined when a width and/or a height of another image (210, 212) is less than a third predetermined value including 120 pixels.

According to some example embodiments, a range of 400 pixels to 600 pixels may include a column width range associated with content text 208. As such, an image width of 400 pixels or higher may draw a user's attention. The image may be determined to be an advertising when a width to a height ratio is larger than 3. The image may occupy the height of a screen when a width to a height ratio is smaller than ⅓. An image with a width to a height ratio of less than ⅓ may also be determined as an advertisement.

An image having a middle image classification may float on a left or a right side of the content text 208. An image identified as having a middle image classification may be extracted or not based on a system or a user selection. In addition a thumbnail image classification may represent a link to a related content. The image having a thumbnail image classification may not be identified as associated with the content. As such, images with a thumbnail image classification may not be extracted.

Figure 3:
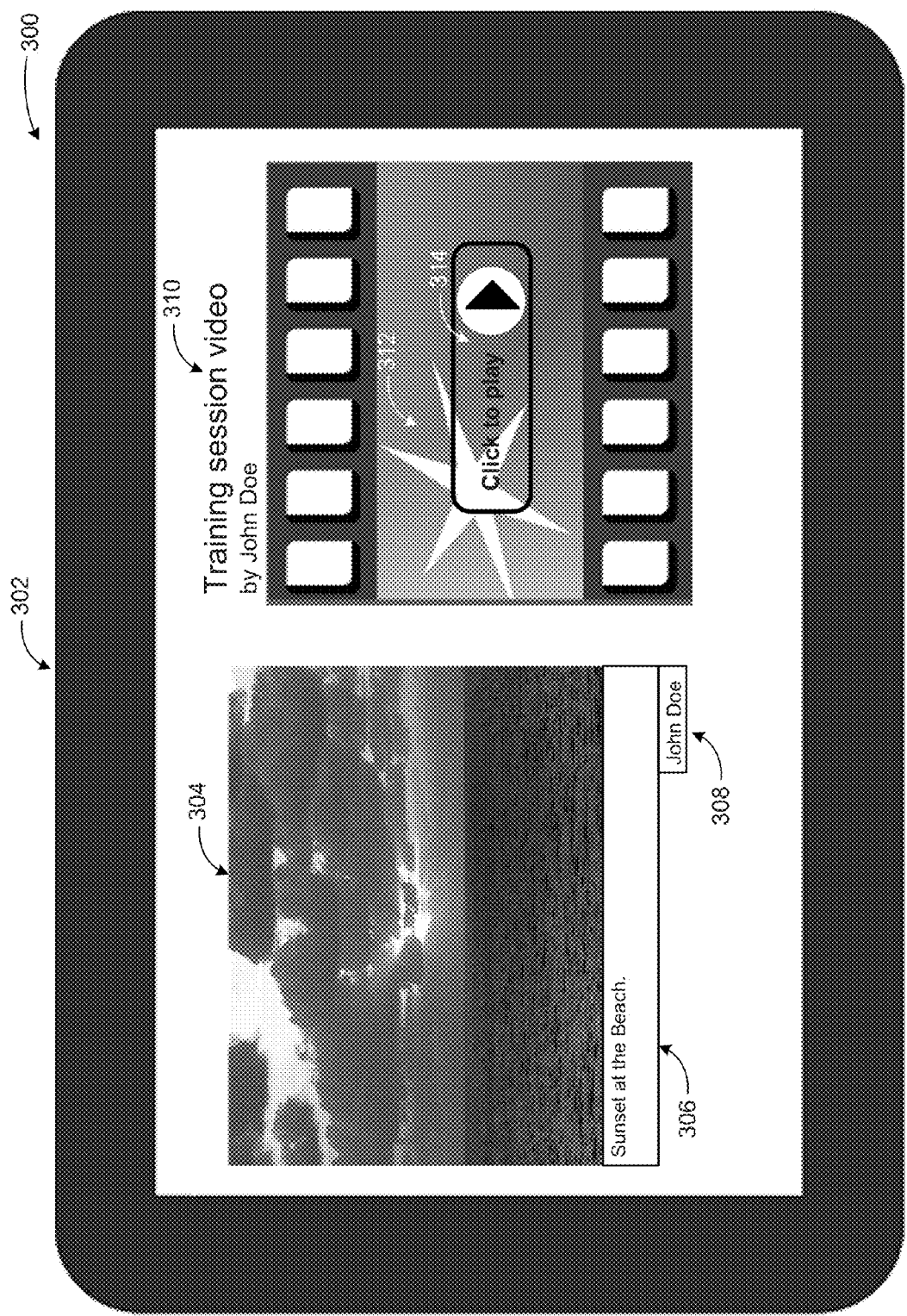
FIG. 3 illustrates an example of detecting a caption, a credit line, and a video associated with images of an article according to embodiments.

FIG. 3 illustrates an example of detecting a caption, a credit line, and a video associated with images of an article according to embodiments. Diagram 300 displays a device 302 presenting an article with a first image 304 with a caption 306 and a credit line 308 and a second image 312 associated with a video.

According to some embodiments, a caption and a credit line associated with an image may be extracted along with the image. An article may be composed with HTML tags encapsulating the first image 304 and associated caption 306 and credit line 308. An example of a tagged image may include:

```
<div class="caption body-width">
  <img width="464" height="548" alt=
  Text - Empty Text Node
  <span style="width: 464px;">
  Text - Empty Text Node
```

An example tagged caption and credit line may include:
<div class=exampleInlineRight">
 <!--startclickprintexclude-->
 <div class="exampleInlineT1Image">
 <div class="exampleInlineT1Caption">
 <div class="exampleInlineT1Credit">
 <!--endclickprintexclude-->
 <!--startclickprintexclude-->
 <div class=exampleInlineRail example300">

The content application may detect caption 306 and credit line 308 by analyzing tags in a DOM tree of the article starting from an <IMG> tag and following a parent link in the DOM tree of the <IMG> tag. The content application may not analyze the <IMG> tag. Three child tags T0, T1, and T2 may be located for each analyzed tag. The content application may determine T0 to include a visible content including the <IMG> tag in focus. T1 and T2 may be determined to include visible content immediately following T0. T2 may be optional because many images may not have credit lines.

The content application may also analyze the visible content of T0, T1, and T2. If T0 includes text, or T1 and T2 include images, the image may be marked as having no caption or no credit line. If a class name or id of T1 and/or T2 is determined to include "caption" and/or "credit", T1 and/or T2 tags may be set as the caption and/or credit line of the associated image. Alternatively, the order of T1 and T2 may be reversed and T2 may be determined to include the caption and T1 may be determined to include the credit line. In addition, if T0, T1, and T2 are the only three visible child tags of a parent tag and a length of the visible content of T1 and T2 may be determined not to exceed a predetermined length then T1 and T2 may be assigned as the caption and credit line of the associated image.

According to other embodiments, a second image 312 may be a screenshot of a video. In response to a user action on the second image 312, the content application may play the associated video. A core presentation of an article presenting main elements of the article may be unable to play a video. As such, it may be preferable to discard or ignore screenshot images of a video such as the second image 312.

Challenge with a video detection scheme may include addition of an <OBJECT> or <VIDEO> tag being added to a DOM tree through scripting language after a user action on the second image 312. As a result, it may impossible to search for <OBJECT> and <VIDEO> tree before insertion into the DOM tree. A label of "video" may be detected in a class name or an identification (id) of the image tag or one of its ancestors for the second image 312. The label may be used to detect the video associated with the second image 312.

In addition, a play control 314 may be used to detect a video associated with the second image 312. The play control 314 may be identified through a <DIV> tag encapsulating it. The play control may also be identified through its location at a center of the second image 312. In addition, the play control 314 may be identified through a text "play" found within an innerText element, an id element, or a class name associated with the play control 314. As such, the second image 312 may be identified as associated with a video if the second image may be determined to have an ancestor tag with a child tag identified as play control 314.

Figure 4:
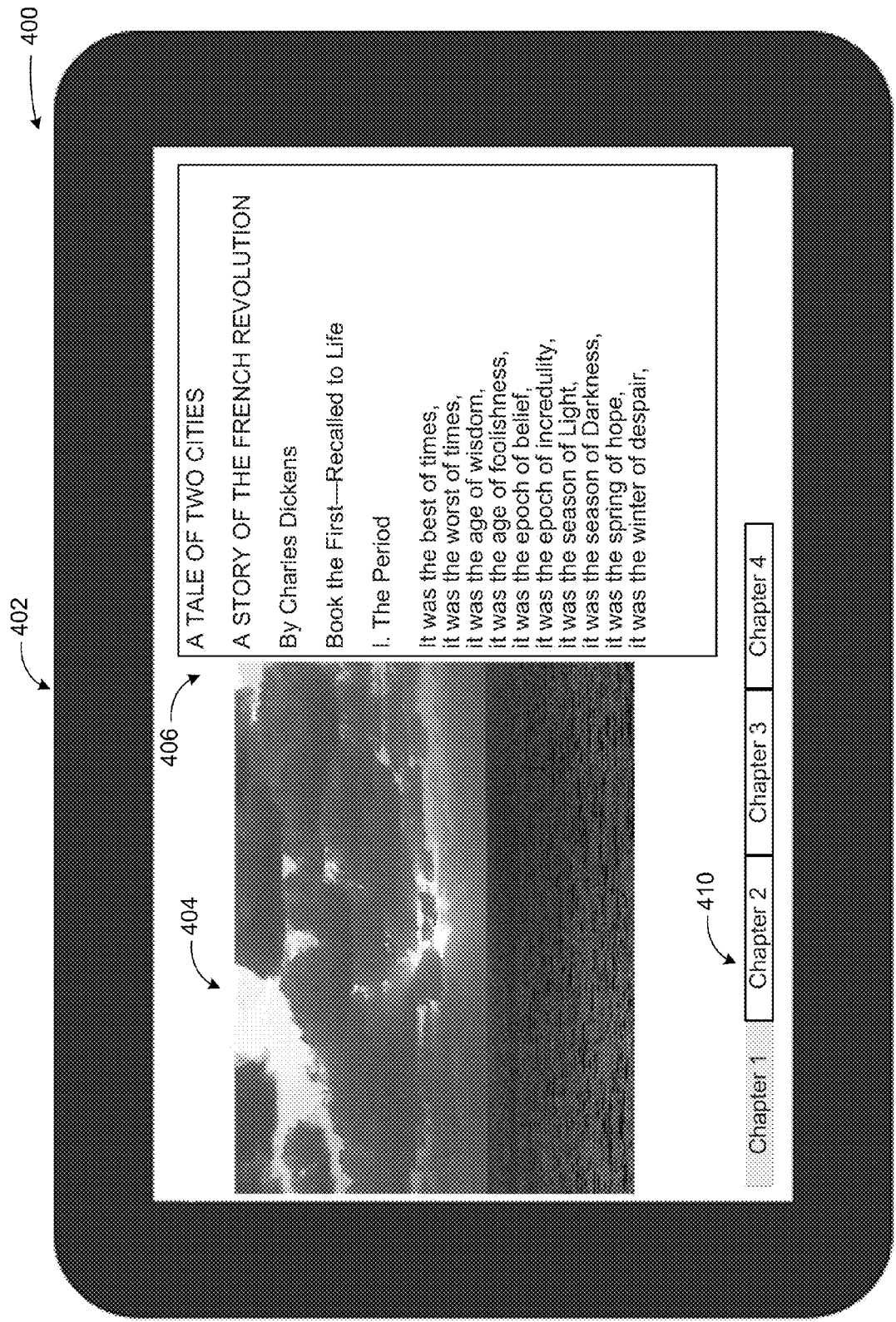
FIG. 4 illustrates an example of detecting a slideshow associated with an article according to embodiments.

FIG. 4 illustrates an example of detecting a slideshow associated with an article according to embodiments. Diagram 400 displays a device 402 showing a slideshow 406 of images.

The slideshow 406 may be a mechanism to illustrate multiple images in a limited space. The slideshow 406 may display an image 404 while hiding others. In response to a user action on a second navigation control 410, the content application may switch to another image using an embedded script.

The content application may locate hidden images while extracting the image 404 associated with the slideshow 406. The hidden images may have their width or height set to 0. Therefore, the hidden images may not be identified with a content of the article. In addition, captions associated with the hidden images may be missed because caption detection may ignore invisible tags in order to filter out undesired elements.

To extract the slideshow 406, the image 404 may be used as a template to locate the hidden images and their captions. Operations to detect and extract the slideshow 406 may include:

1. Starting with the image 404 (and associated caption and credit line) and following a parent link in a DOM tree of a source code of the article to examine ancestor tags of the image 404 to determine the slideshow 406;

2. If a width and a height associated with an ancestor tag may be larger than a predetermined factor including 1.5 times a width or height of the image 404, determine no slideshow associated with the image 404;

3. Else, cluster the ancestor tag's children based on their sub DOM tree shape;

4. Compute a common class name for one of the clusters;

5. Locate the cluster, i.e.: C0, including the image 404 within the DOM tree. Find other clusters sharing the common class name with C0 within the DOM tree;

6. Merge the tags in C0 and the clusters sharing common class name with C0,

7. If the merged set of clusters is determined to include more than 1 tag, determine the merged set as the slideshow 406. Else determine the image 404 as an isolated image; and 8. If the slideshow 406 is detected, execute an alignment of sub DOM trees of hidden tags in the merged set against the sub DOM tree of a tag including the image 404. And, use and a result of the alignment to locate captions and credit lines associated with the hidden images associated with the hidden tags.

In step 8, a tree alignment algorithm may be employed to locate the captions and credit lines of the hidden images. The tree alignment algorithm may include a unique case of a largest common sub-graph problem with two constraints. The constraints may include 1) two nodes that may be matched if they share the same tag name. 2) Two nodes that may be matched if their parent nodes may be matched. A recursive algorithm may provide a best alignment efficiency, an example of which may include: function AlignTree(Tree left, Tree right)

```
if (left.root.tagName !=right.root.tagName)
  return empty_map;
mapping.add(<left.root, right.root>);
mapping1=AlignForest(left.children, right.children);
return (mapping union mapping1);
function AlignForest(TreeList left, TreeList right)
  lfirst=left.first;
  lrest=second to last elements in left;
  best_mapping=AlignForest(lrest, right);
  for (i=1 to right.length)
    rtree=i-th element in right;
    rrest=(i+1)-th to last element in right;
    mapping=AlignTree(lfirst, rtree) union AlignForest(lrest, rrest);
    if (mapping has more matched nodes than best_mapping)
      best_mapping=mapping;
```

The example scenarios and schemas in FIG. 2 through 4 are shown with specific components, data types, and configurations. Embodiments are not limited to systems according to these example configurations. Determining images of an article for an extraction may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
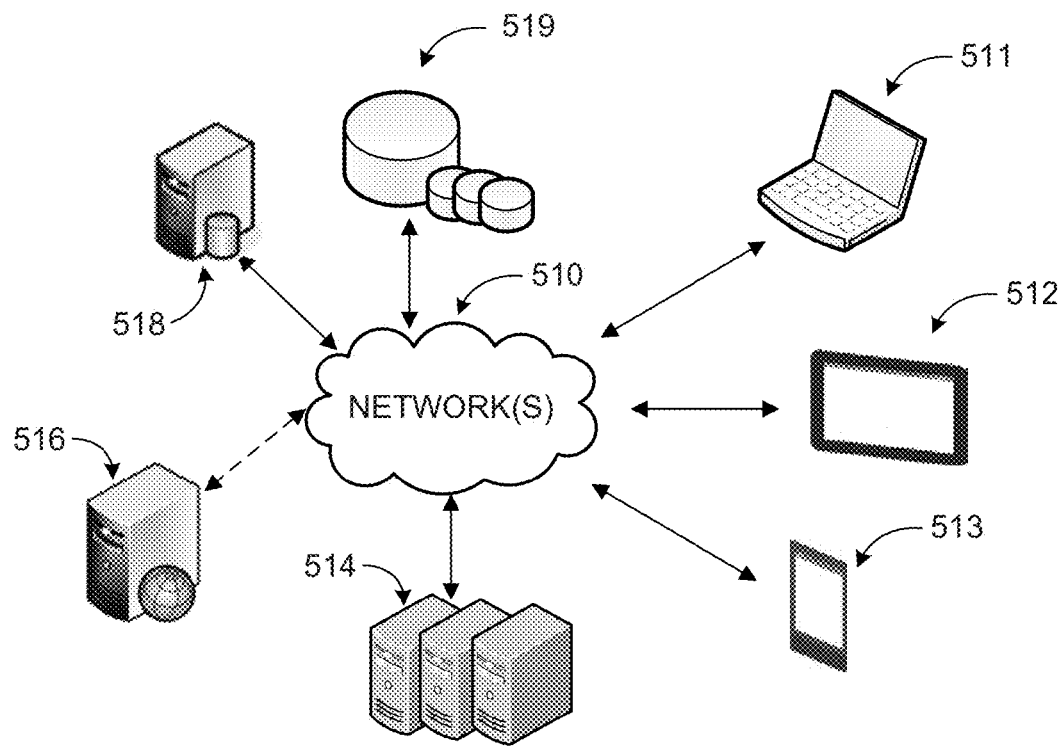
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may execute on individual computing devices such as a smart phone 513, a tablet device 512, or a laptop computer 511 ('client devices') and retrieve an article intended for display through network(s) 510.

As discussed above, an image of an article may be identified and extracted. A caption and a credit line associated with the image may also be extracted. Another image associated with a video and the video may be identified and extracted. In addition, a slideshow within the article may be identified and extracted. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data resources, and data distribution systems may be used to determine images of an article for an extraction. Furthermore, the networked environments discussed in FIG. 5 are for illustration purposes only. Embodiments are not limited to the example applications, modules, or processes.

Figure 6:
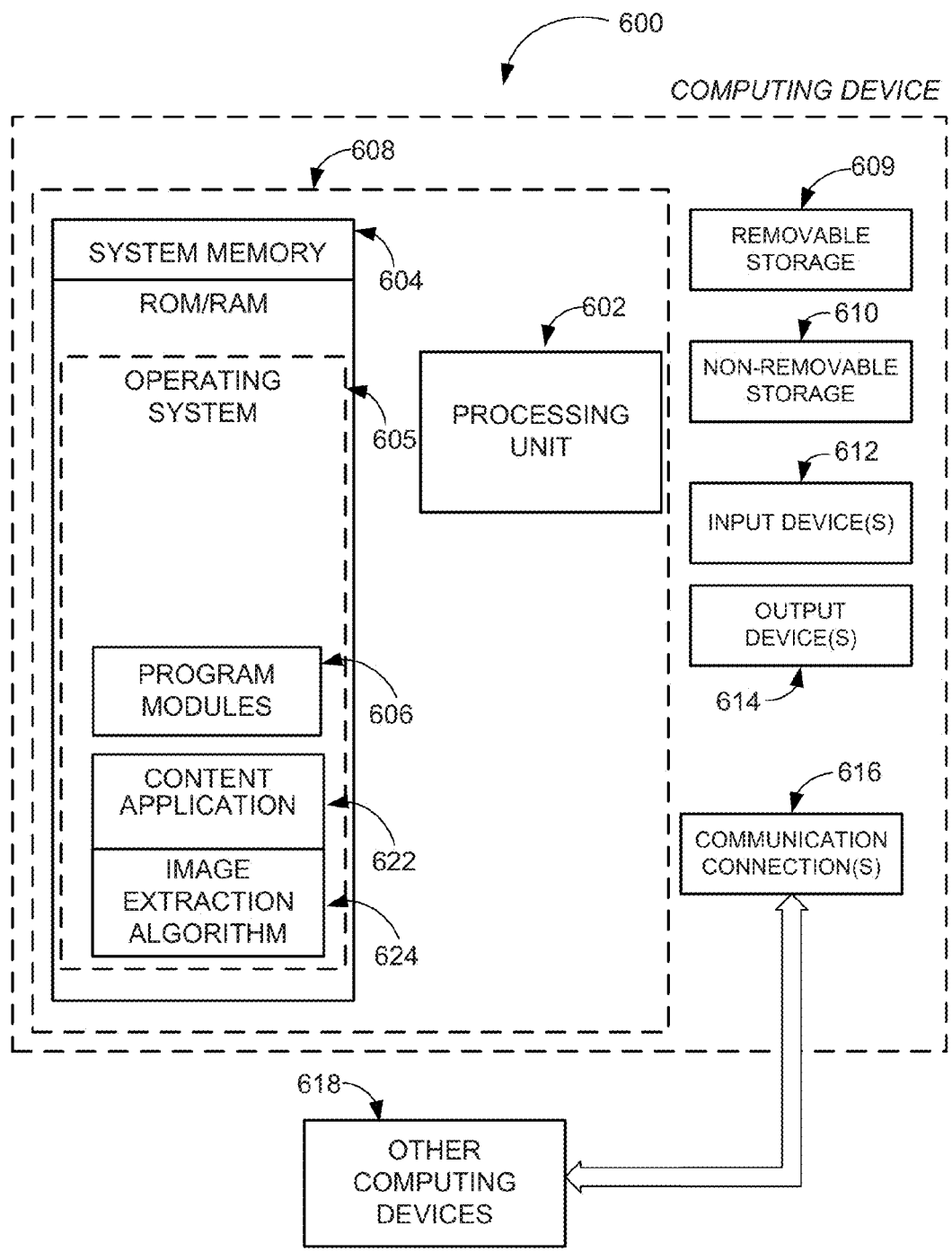
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, a content application 622, and an image extraction algorithm 624.

A content application 622 may identify a first image associated with a content of an article and detect a caption and a credit line associated with the article. The image extraction algorithm 624 may extract the first image, the caption, and the credit line. The content application 622 may also detect a second image of the article associated with the image. The second image and the video may be extracted by the image extraction algorithm 624. In addition, a slideshow within the article may be detected by the content application 622 and extracted by the image extraction algorithm 624, executed by the device 600. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
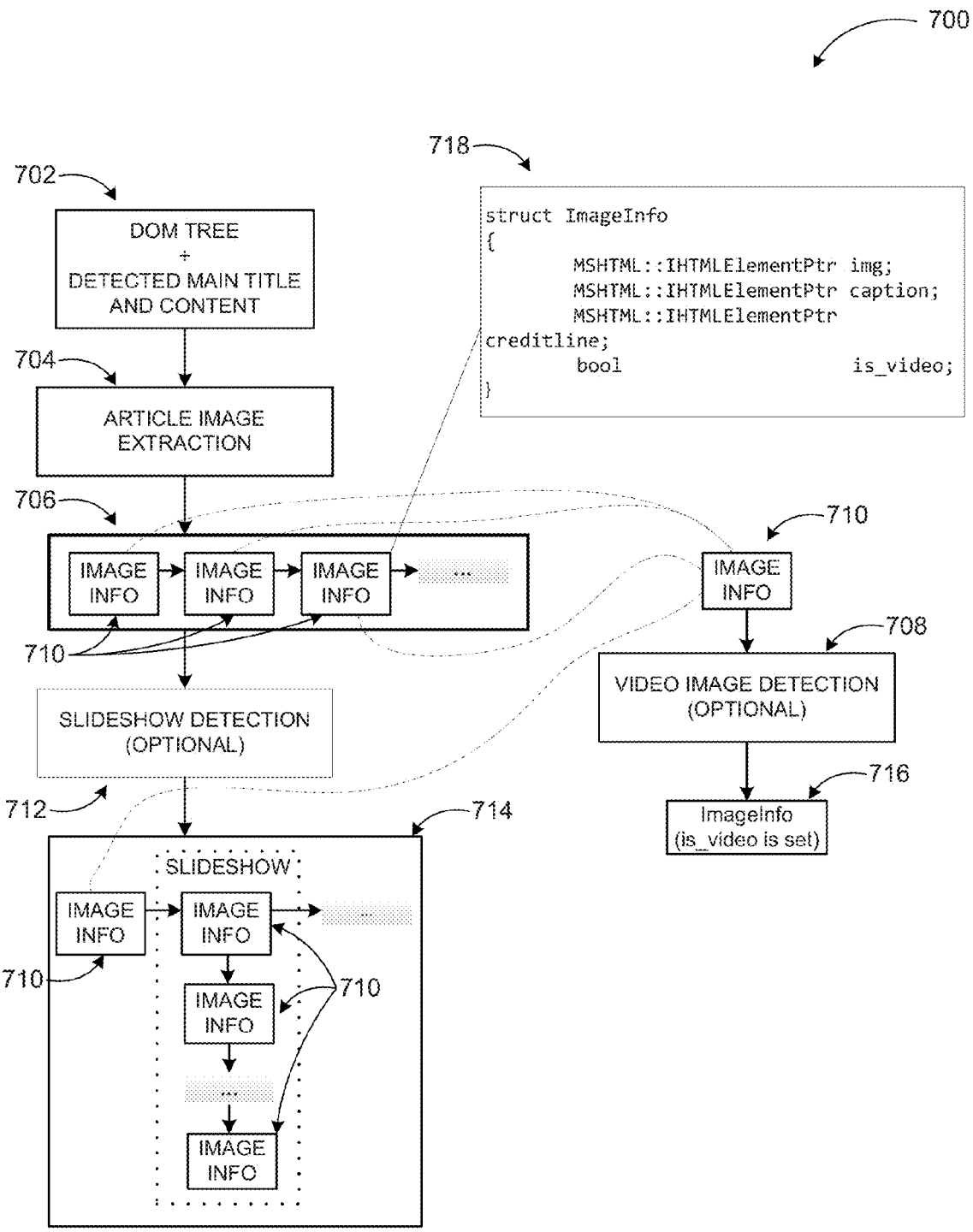
FIG. 7 illustrates an overall view of a process for extracting images from an article using various modules.

FIG. 7 illustrates an overall view of a process for extracting images from an article using various modules. As shown in diagram 700, the extraction may begin with the DOM tree and detected main title and content 702 being provided to an article image extraction module 704.

According to some embodiments, the article image extraction module 704 may be used to extract all image candidates in a valid region. Then, for each candidate, a caption and credit line may be found, if any. At the same time, an image may be classified into some categories. Based on the results of caption detection and classification, a determination may be made whether an image candidate is an article image according to predefined rules. Output may be an array of images 706 with captions and credit lines. Each image information 710 may be a piece of code 718 as shown in the diagram 700.

An optional slideshow detection module 712 (because some applications may not display a slideshow well) may be used to detect slideshows based on the results of article image extraction module 704 and extract the slideshows. The slideshow detection module 712 may group some article images or find extra hidden images from the DOM tree 702. An output 714 of the slideshow detection module 712 may be a two-dimensional array. In a primary array, each element may be an article image or an array of images because they are detected as a slideshow.

In some embodiments, an optional video image detection module 708 may be used because in some scenarios a hero image of a video may be displayed whereas in other scenarios the image may be desired to be removed if it is associated with a video. The video image detection module 708 may be applied to any article image, but not applied to the images in a slideshow as the images in a slideshow may be seldom associated with videos. An output of the video detection module 708 may be to set a flag 716 named "is_video". Then, the application may decide how to use the results.

Figure 8:
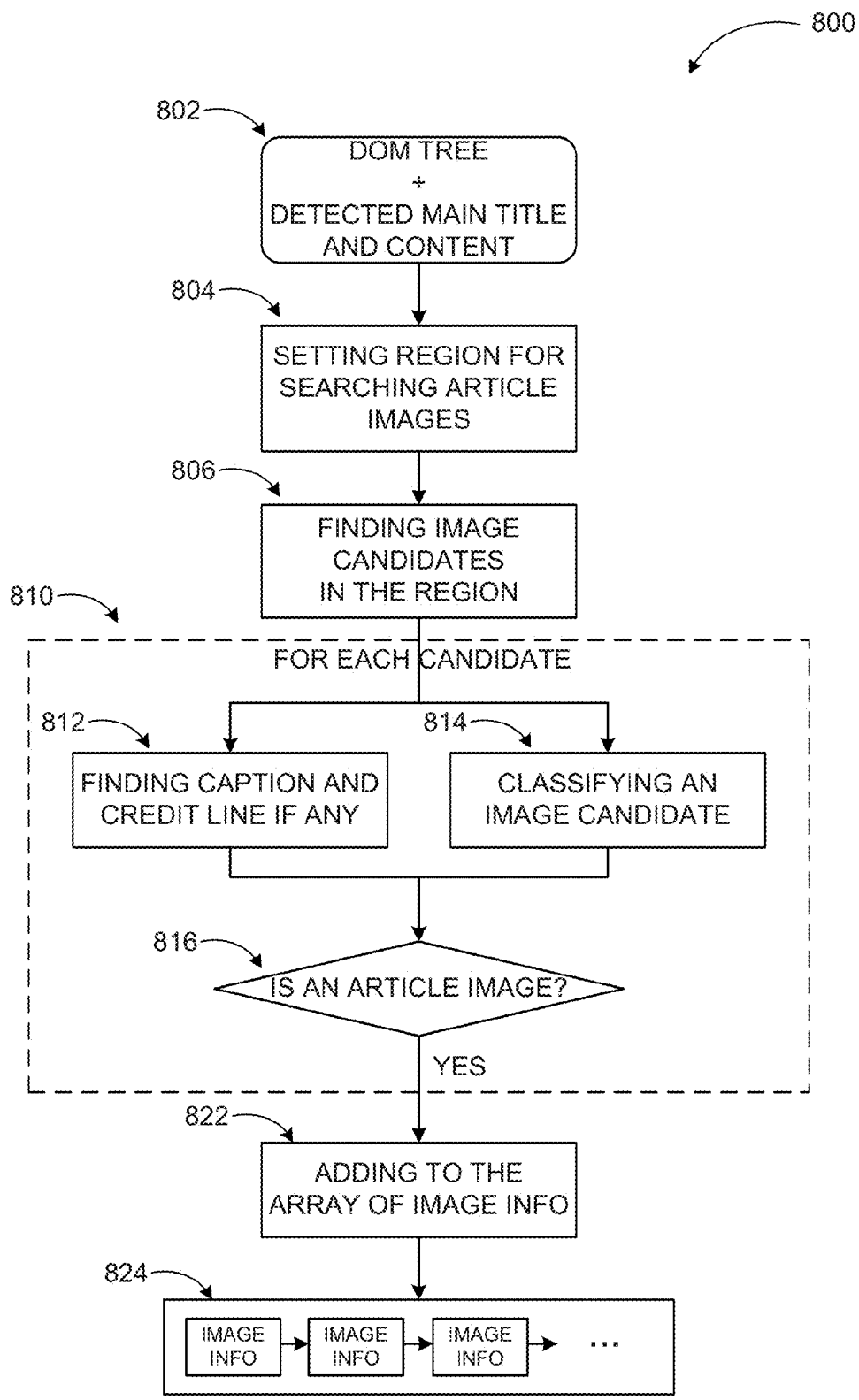
FIG. 8 illustrates a logic flow diagram for a process determining images of an article for an extraction of the article according to embodiments.

FIG. 8 illustrates a logic flow diagram for a process determining images of an article for an extraction according to embodiments. Process 800 may be implemented by a content application, in some examples.

Process 800 may begin with operation 804, where the content application may receive the DOM tree and detected main title and content 802, and set region for searching article images. Upon finding image candidates in a region (806) an iterative process 810 may be performed for each candidate. For each candidate, a caption and a credit line may be found (812), if there are any, and the image candidate may be classified (814). Then, a determination may be made at decision operation 816 as to whether the image candidate is an article image or not. If the image candidate is determined to be an article image, information associated with the image candidate may be added (822) to an array of image information 822.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Determining images of an article for an extraction, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for determining images of an article for an extraction, the method comprising:
   identifying a first image associated with a content of the article;
   detecting a caption and a credit line associated with the first image;
   extracting the first image, the caption, and the credit line;
   detecting a second image of the article associated with an embedded video;
   extracting the second image and the video;
   detecting a slideshow within the article; and
   extracting the slideshow.

2. The method of claim 1, further comprising:
   identifying a title and a content text of the article through associated tags.

3. The method of claim 2, further comprising:
   identifying the first image by detecting a location of the first image within the article, the location including at least one of:
   prior to the title,
   between the title and the content text, and
   within the content text.

4. The method of claim 3, further comprising:
   parsing a source code of the article into a document object model (DOM) tree;
   assigning each tag within the source code a source index;
   determining an of the tags order from the source index of each tag;
   determining relative locations of the tags by analyzing the order of tags within the article and interpreting the article as a document stream; and
   determining the location of the first image by comparing a relative location of a first tag of the image with relative locations of a second tag of the title and a third tag of the content text.

5. The method of claim 1, further comprising:
classifying an analyzed image into a category including one of: a large image category, a middle image category, and a thumbnail image category, wherein:
   the large image category includes a width of the first image greater or equal to a first predetermined value;
   the middle image category includes the width of the first image less than the first predetermined value and the width and a height of the first image greater than a second predetermined value; and
   the thumbnail image category includes the height of the first image less than a third predetermined value.

6. The method of claim 5, further comprising:
identifying the first image from the analyzed image being in at least one of: the large image category and the middle image category.

7. The method of claim 6, further comprising:
discarding the analyzed image in the thumbnail image category.

8. The method of claim 1, further comprising:
detecting the caption and the credit line by analyzing tags of the article within a document object model (DOM) tree of a source code of the article starting from a tag of the first image; and
locating three child tags including T0, T1, and T2 within the DOM tree.

9. The method of claim 8, further comprising:
determining T0, T1, and T2 to include visible content;
analyzing the visible content of T0, T1, and T2;
in response to determining at least one of: a class name and an identification of the visible content of T1 and T2 to include at least one of: a "caption" and a "credit," assigning at least one of: T1 as the caption and T2 as the credit line;
in response to determining a length of the visible content of T1 and a length of the visible content of T2 not to exceed a predetermined length, assigning at least one of: T1 as the caption and T2 as the credit line.

10. The method of claim 1, further comprising:
detecting the video associated with the second image through at least one of: a label of "video," a class name, and an identification of a tag of the second image.

11. The method of claim 10, further comprising:
excluding the second image in response to determining a core presentation of the article, presenting main elements of the article, unable to play the video.

12. A computing device to determine images of an article for an extraction, the computing device comprising:
a memory configured to store instructions; and
a processor coupled to the memory, the processor executing a content application in conjunction with the instructions stored in the memory, wherein the application is configured to:
   identify a title and a content text of the article through associated tags;
   identify a first image associated with a content of the article by detecting a location of the first image within the article, the location including at least one of:
   prior to the title, between the title and the content text, and within the content text;
   detect a caption and a credit line associated with the first image;
   extract the first image, the caption, and the credit line;
   detect a second image of the article associated with an embedded video;
   extract the second image and the video;
   detect a slideshow within the article; and
   extract the slideshow.

13. The computing device of claim 12, wherein the application is further configured to:
follow a parent link in a document object model (DOM) tree of a source code of the article to examine an ancestor tag of a third image to detect the slideshow.

14. The computing device of claim 13, wherein the application is further configured to:
in response to determining a first height and a first width associated with the ancestor tag being larger than a predetermined factor of a second width and a second height of the third image, determine no slideshow associated with the third image; and
in response to determining the first height and the first width associated with the ancestor tag being less than or equal to the predetermined factor of the second width and the second height of the third image, cluster children of the ancestor tag based on an associated sub DOM tree shape.

15. The computing device of claim 14, wherein the application is further configured to:
determine a common class name for a first cluster;
locate the first cluster within the DOM tree and find a second cluster sharing the common class name with the first cluster; and
merge the first cluster and the second cluster into a third cluster using associated tags.

16. The computing device of claim 15, wherein the application is further configured to:
determine the third cluster as the slide show in response to determining the third cluster including more than one tag; and
determine the third image as an isolated image in response to determining the third cluster to include no tags.

17. The computing device of claim 16, wherein the application is further configured to:
in response to detecting the slideshow, execute an alignment of a sub DOM tree of a hidden tag in the third cluster against another sub DOM tree of the third image; and
use a result of the alignment to locate another caption and another credit line of a hidden image associated with the hidden tag.

18. A computer-readable memory device with instructions stored thereon for determining images of an article for an extraction, the instructions comprising:
identifying a title and a content text of the article through associated tags;
identifying a first image associated with a content of the article by detecting a location of the first image within the article, the location including at least one of: prior to the title, between the title and the content text, and within the content text;
detecting a caption and a credit line associated with the first image;
detecting the caption and the credit line by analyzing tags of the article within a document object model (DOM) tree of a source code of the article starting from a tag of the first image;
extracting the first image, the caption, and the credit line;
detecting a second image of the article associated with an embedded video;
extracting the second image and the video;
detecting a slideshow within the article; and
extracting the slideshow.

19. The computer-readable memory device of claim 18, wherein the instructions further comprise:

locating three child tags including T0, T1, and T2 within the DOM tree;
determining T0, T1, and T2 to include visible content;
analyzing the visible content of T0, T1, and T2; and
in response to determining at least one of: a class name and an identification of the visible content of T1 and T2 to include at least one of: a "caption" and a "credit," assigning at least one of: T1 as the caption and T2 as the credit line.

20. The computer-readable memory device of claim 18, wherein the instructions further comprise:
detecting the video associated with the second image through at least one of: a label of "video," a class name, and an identification of a tag of the second image; and
ignoring the second image in response to determining a core presentation of the article presenting main elements of the article unable to play the video.

* * * * *